United States Patent
Ku et al.

(10) Patent No.: US 12,095,519 B2
(45) Date of Patent: Sep. 17, 2024

(54) AUTOMATIC ATTENUATION OF ANALOG-DIGITAL-CONVERTER (ADC) INPUT SIGNAL BASED ON ERROR VECTOR MAGNITUDE (EVM) PERFORMANCE

(71) Applicant: VIAVI SOLUTIONS INC., Chandler, AZ (US)

(72) Inventors: Bon-Jin Ku, Seoul (KR); Seung-Gon Hong, Incheon (KR); Chang-Hyun Park, Goyang-si (KR)

(73) Assignee: VIAVI SOLUTIONS INC., Chandler, AZ (US)

( * ) Notice: Subject to any disclaimer, the term of this patent is extended or adjusted under 35 U.S.C. 154(b) by 87 days.

(21) Appl. No.: 17/953,943

(22) Filed: Sep. 27, 2022

(65) Prior Publication Data

US 2024/0106551 A1     Mar. 28, 2024

(51) Int. Cl.
*H04B 3/46*      (2015.01)
*H04B 17/29*    (2015.01)

(52) U.S. Cl.
CPC ................... *H04B 17/29* (2015.01)

(58) Field of Classification Search
CPC ........ H04B 17/29; H04B 17/21; H04B 17/25; H04B 17/19; H04B 3/46; H04L 27/368; H04L 27/364; H04W 24/06
USPC .......................................... 375/224, 259, 316
See application file for complete search history.

(56) References Cited

U.S. PATENT DOCUMENTS

| | | | |
|---|---|---|---|
| 2012/0309321 A1* | 12/2012 | Agarwal | H04W 72/20 455/67.11 |
| 2019/0181964 A1* | 6/2019 | Christoffers | H04B 17/19 |
| 2019/0356271 A1* | 11/2019 | Amorosa | H04L 27/14 |
| 2021/0013975 A1* | 1/2021 | Jacquet | H04B 17/14 |
| 2021/0243713 A1* | 8/2021 | Ellenbeck | H04W 56/002 |
| 2021/0258086 A1* | 8/2021 | Hsieh | H04B 17/29 |
| 2021/0344579 A1* | 11/2021 | Hirschmann | H04L 43/045 |
| 2022/0045423 A1* | 2/2022 | Scott | H04B 7/0848 |
| 2023/0299809 A1* | 9/2023 | Hayslett | H04B 1/40 455/73 |
| 2023/0417799 A1* | 12/2023 | Park | G01R 31/001 |

(Continued)

OTHER PUBLICATIONS

Bruce Hemp et al., Optimization of EVM Performance in IQ Modulators, May 2016, Application Note 146, p. 4.

(Continued)

*Primary Examiner* — Khai Tran
(74) *Attorney, Agent, or Firm* — Mannava & Kang, P.C.

(57) ABSTRACT

A radio frequency (RF) test device such as a spectrum analyzer may include an RF attenuator to attenuate a received RF signal; a mixer to down-convert the attenuated RF signal; an IF attenuator to attenuate the down-converted signal; an analog-to-digital converter (ADC) to digitize the attenuated, down-converted signal; and a processor, which may select attenuation values for one or more of the RF attenuator and the IF attenuator based on an error magnitude vector (EVM) analysis, an RF signal type, and/or a signal level at an input of the ADC. The processor may use a look-up table for the selection. Initial attenuation values may be selected based on an expected RF signal type, RF signal frequency, and/or RF signal bandwidth. The attenuation values may also be selected in an iterative manner stepping the attenuation values up or down.

20 Claims, 9 Drawing Sheets

(56) References Cited

U.S. PATENT DOCUMENTS

2024/0048356 A1* 2/2024 Seger, Jr. ............... G06F 21/72

OTHER PUBLICATIONS

Eric Newman, Receiver Optimization Using Error Vector Magnitude Analysis, Chapter VII, p. 5.
Erkan Acar, How Error Vector Magnitude (EVM) Measurement Improves Your System-Level Performance, p. 6.
Jim Karki, Analyzing ADC SNR, SFDR in high-speed apps, Nov. 1, 2010, p. 10.

* cited by examiner

AUTOMATIC ATTENUATION OF ANALOG-DIGITAL-CONVERTER (ADC) INPUT SIGNAL BASED ON ERROR VECTOR MAGNITUDE (EVM) PERFORMANCE

TECHNICAL FIELD

This patent application is directed to radio frequency (RF) signal analyzers, and more specifically, an RF signal analyzer automatic attenuation of an analog-digital-converter (ADC) input signal based on error vector magnitude (EVM) performance.

BACKGROUND

A cell site, also known as a cell tower or cellular base station, includes an antenna and electronic communications equipment to support cellular mobile device communication. The antenna and equipment are typically placed in connection with a radio mast or tower, and the equipment generally connects cell site air interfaces to wireline networks, which may be comprised of fiber optic cables and coaxial cables. When setting up or maintaining a cell site, technicians use, among other test devices, spectrum analyzers, typically portable spectrum analyzers, to test signal strength, frequency, phase, interference, etc.

At a cell site, there may be a variety of signals depending on technology, e.g., 4G Long Term Evolution (LTE), 5G New Radio (NR), Dynamic Spectrum Sharing (DSS), etc. Signal strengths in such an environment may vary significantly depending on the type of signal, bandwidth of the signal, etc. Thus, various components of a test device may receive wide ranging input signals, which may impact a performance of the components and/or the test device.

BRIEF DESCRIPTION OF DRAWINGS

Features of the present disclosure are illustrated by way of example and not limited in the following Figure(s), in which like numerals indicate like elements, in which.

DETAILED DESCRIPTION

For simplicity and illustrative purposes, the present disclosure is described by referring mainly to examples and embodiments thereof. In the following description, numerous specific details are set forth in order to provide a thorough understanding of the present disclosure. It will be readily apparent, however, that the present disclosure may be practiced without limitation to these specific details. In other instances, some methods and structures readily understood by one of ordinary skill in the art have not been described in detail so as not to unnecessarily obscure the present disclosure. As used herein, the terms "a" and "an" are intended to denote at least one of a particular element, the term "includes" means includes but not limited to, the term "including" means including but not limited to, and the term "based on" means based at least in part on.

ADCs, an important component of signal analyzers such as spectrum analyzers, have a variety of performance metrics. Some example metrics may include signal-to-noise ratio (SNR), resolution, quantization error, and dither. An ADC characteristic that may impact the ADC's performance is its input range. If an input signal to the ADC is too low, the SNR may become unacceptably low. If the input signal is too high, the ADC may move into overrange mode and digitization errors may be introduced. Some ADCs may include an input range selector, where the range may be selected (e.g., by a user) among one or more static ranges to prevent over ranging or too low input signal levels. On the other hand, user selection may not be an optimal approach in environments, where signal strength may vary drastically.

In some examples of the present disclosure, an RF test device such as a spectrum analyzer may include a broadband ADC. An input signal to the ADC may be attenuated either before the RF signal is down-converted by a mixer by an RF attenuator and/or post-mixer by an intermediate frequency (IF) attenuator. Attenuation values for the RF attenuator and/or the IF attenuator may be selected based on an error magnitude vector (EVM) analysis of the ADC, an RF signal type, and/or a signal level at an input of the ADC. A processor setting the attenuation values may use a look-up table for the selection. Initial attenuation values may be selected based on an expected RF signal type, RF signal frequency, and/or RF signal bandwidth. The attenuation values may also be selected in an iterative manner by stepping the attenuation values up or down.

As used herein, ADC characteristics may include, but are not limited to, resolution, signal-to-noise-and-distortion ratio (SINAD), effective number of bits (ENOB), signal-to-noise ratio (SNR), total harmonic distortion (THD), total harmonic distortion plus noise (THD+N), and spurious free dynamic range (SFDR). Along with two or more input signals with different frequencies, bandwidths, and/or signal types, the test device may also receive a user selection for frequency, bandwidth, and/or signal type of the received input signals. A frequency of the input signal, as used herein, may refer to a center frequency of the signal with the bandwidth (i.e., frequency range of channel) centered around the frequency. A signal type, also referred to as "technology", may refer to a category of signal. For example, the signal may be a 4G LTE, 5G NR, 6G, DSS, LTE-FDD, LTE-TDD, NR, DSS-FDD, DSS-TDD signal, where FDD is frequency division duplex and TDD is time division duplex. The signal type may be associated with a specific set of center frequencies and bandwidths, along with a modulation of the signal.

In some examples, the EVM analysis may include analysis of one or more of a resolution, a signal-to-noise-and-distortion ratio (SINAD), an effective number of bits (ENOB), a signal-to-noise ratio (SNR), a total harmonic distortion (THD), a total harmonic distortion plus noise (THD+N), or a spurious free dynamic range (SFDR) of the ADC. In other examples, the EVM analysis may also include characteristics of the RF test device.

Some advantages and benefits of the systems and methods described herein are readily apparent. For example, automatically attenuating an input signal for an ADC based on EVM performance may improve an accuracy of the analog-to-digital conversion by ensuring higher SNR and/or reduced digitization error, and thereby, an overall performance of the test device. Accurate testing and analysis of network signals and any interfering signals, in turn, may improve overall performance of a communications network. Other benefits and advantages may also be apparent.

Figure 1:
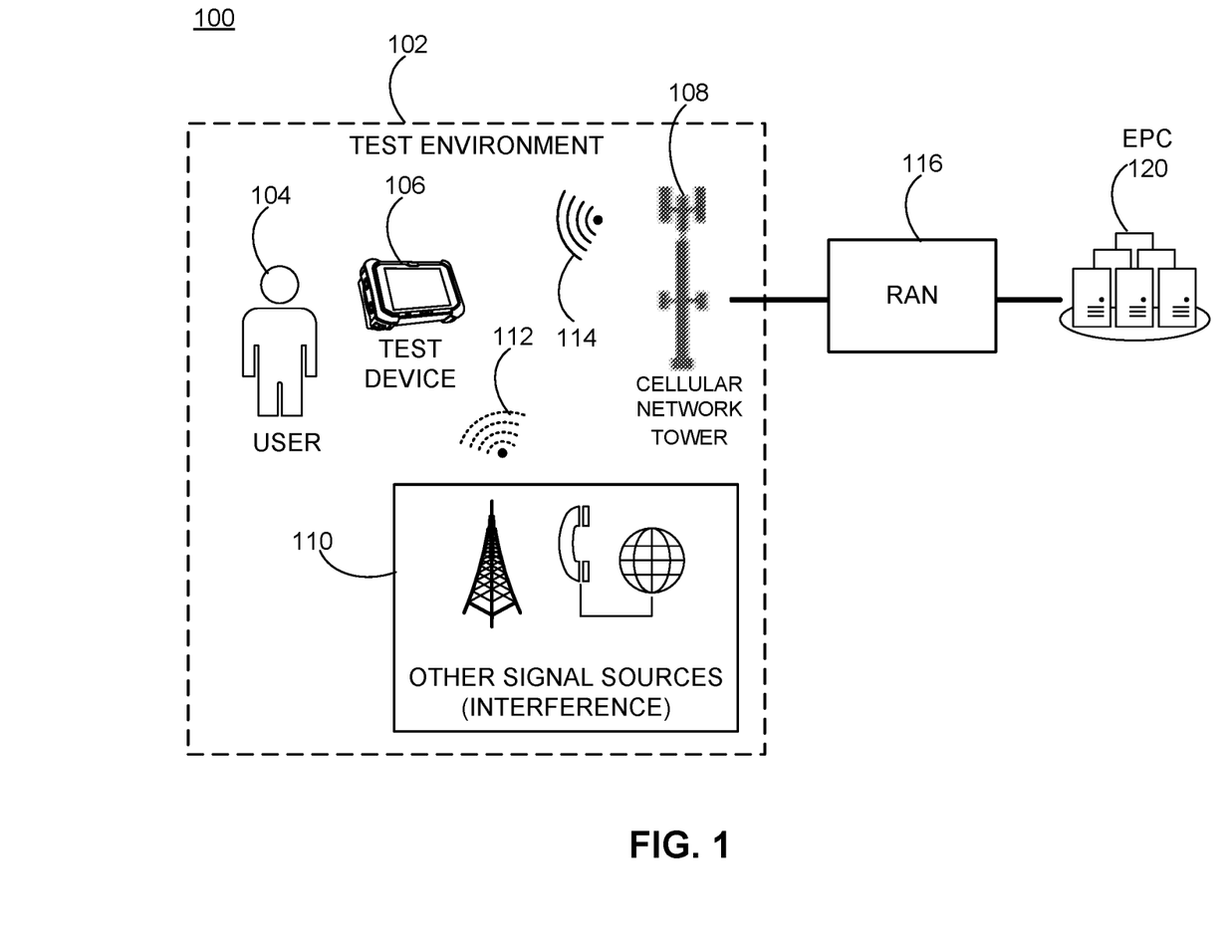
FIG. 1 illustrates a diagram of a test device in a test environment, according to an example.

FIG. 1 illustrates a diagram 100 of a test device 106 in a test environment 102, according to an example. As shown in the diagram 100, a user 104 (e.g., technician) may use a test device 106 to test and analyze signals 114 from a cellular network tower 108, as well as other signals 112, which may come from other signal sources 110 such as a radio tower, telecom signals, and others, which may interfere with the signals 114 from the cellular network tower 108. The cellular network tower 108 may be part of a cell site and connected to backhaul via a radio access network (RAN) 116 and the backhaul may connect to Evolved Packet Core (EPC) 120.

A connection between the cellular network tower 108 and the rest of the world may be referred to as a backhaul link or simply backhaul. A backhaul may include wired, fiber optic and wireless components, such as microwave transmission equipment. In conventional 3G and 4G architectures, fronthaul is associated with a RAN 116 architecture including centralized base band units (BBUs), i.e., baseband controllers, and standalone remote radio heads (RRHs) installed at remote cell sites. These BBU and RRH functional blocks, as well as the equipment that performs these functions, are located further away from each other than in prior mobile backhaul models. In some instances, the RRH and BBU are at the same location. In other instances, the RRH is located at the cell site, whereas the BBU is located in a centralized and protected location where it serves multiple RRHs. The optical links that interconnect the BBU and the multiple RRHs are referred to as fronthaul. The fronthaul includes interfaces between the RRH and the BBU. The backhaul includes interfaces between the BBU and the EPC 120.

In an example, the test environment 102 may include the cell site, which includes the cellular network tower 108 or cellular base station having antennas and electronic communications equipment to support cellular mobile device communication. The antennas and equipment are typically placed in connection with a radio mast or tower, and the equipment generally connects cell site air interfaces to wireline networks, which may be include fiber optic cables and coaxial cables. Typically, the cell site may be connected to backhaul via the RAN 116 and the backhaul may connect to the EPC 120.

The RAN is the part of a mobile network that connects end-user devices, like smartphones, to the cloud. This is achieved by sending information via radio waves from end-user devices to a RAN's transceivers, and finally from the transceivers to the core network which connects to the global internet. Diagram 100 shows the test device 106 performing signal analysis. In an example, the user 104, such as a cellular service provider technician, may use the test device 106 to perform signal analysis for discovered carrier frequency and technology as well as discovered channels of selected technologies. Furthermore, interference hunting and beam centric electromagnetic field (EMF) testing on a selected carrier may be performed with the test device 106. In an example use case, the testing may be performed when the cell site is being installed, such as to ensure proper operation of the cell site with user devices, such as smartphones or other end user cellular devices. In another example use case, after installation, customers of the cellular service provider may be having technical issues, and the user 104 may use the test device 106 to check for signal interference from the other signal sources 110 or other potential causes of the technical issues so the technical issues can be resolved.

As discussed above, the test device 106 may be operable to perform an analysis on selected channels (by the user 104 or automatically). Carrier frequencies of available channels for one or more technologies may also be detected automatically or by the user 104. The carrier frequencies may be a center frequency and/or a synchronization signal block (SSB) frequency depending on the technology. The technologies may include, but are not limited to, 4G LTE, 5G NR, and DSS. Additional examples of the technologies may include LTE-FDD, LTE-TDD, NR, DSS-FDD, DSS-TDD where FDD is frequency division duplex and TDD is time division duplex.

In an example, the analysis of signals that can be performed by the test device 106 includes signal and spectrum analysis of received RF signals. The spectrum analysis may include a real-time display of signal level, such as dB, and frequency for the signals in a particular channel. The signal analysis can display information, including carrier frequency for the LTE and NR technologies of the channel, physical cell ID (PCI), channel power, Received Signal Strength Indicator (RSSI), Reference Signal Received Power (RSRP), Reference Signal Received Quality (RSRQ), Signal to Interference plus Noise Ratio (SINR), and antenna and other 3GPP specified parameters and EVM.

Accurate testing and analysis of network signals and any interfering signals may improve overall performance of a communications network. However, supporting high performance functions with various frequency and bandwidths, especially at and above 6 GHz, may be a challenge for spectrum analyzers. While analysis of various signals involves a number of components and their respective performance characteristics in the test device 106, ADC performance may be a substantial contributor to accurate analysis or lack thereof. In some examples, automatic attenuation of an input of ADC(s) may be provided in the test device 106, thus increasing an overall efficiency and performance of the spectrum analyzer (test device 106).

Figure 2:
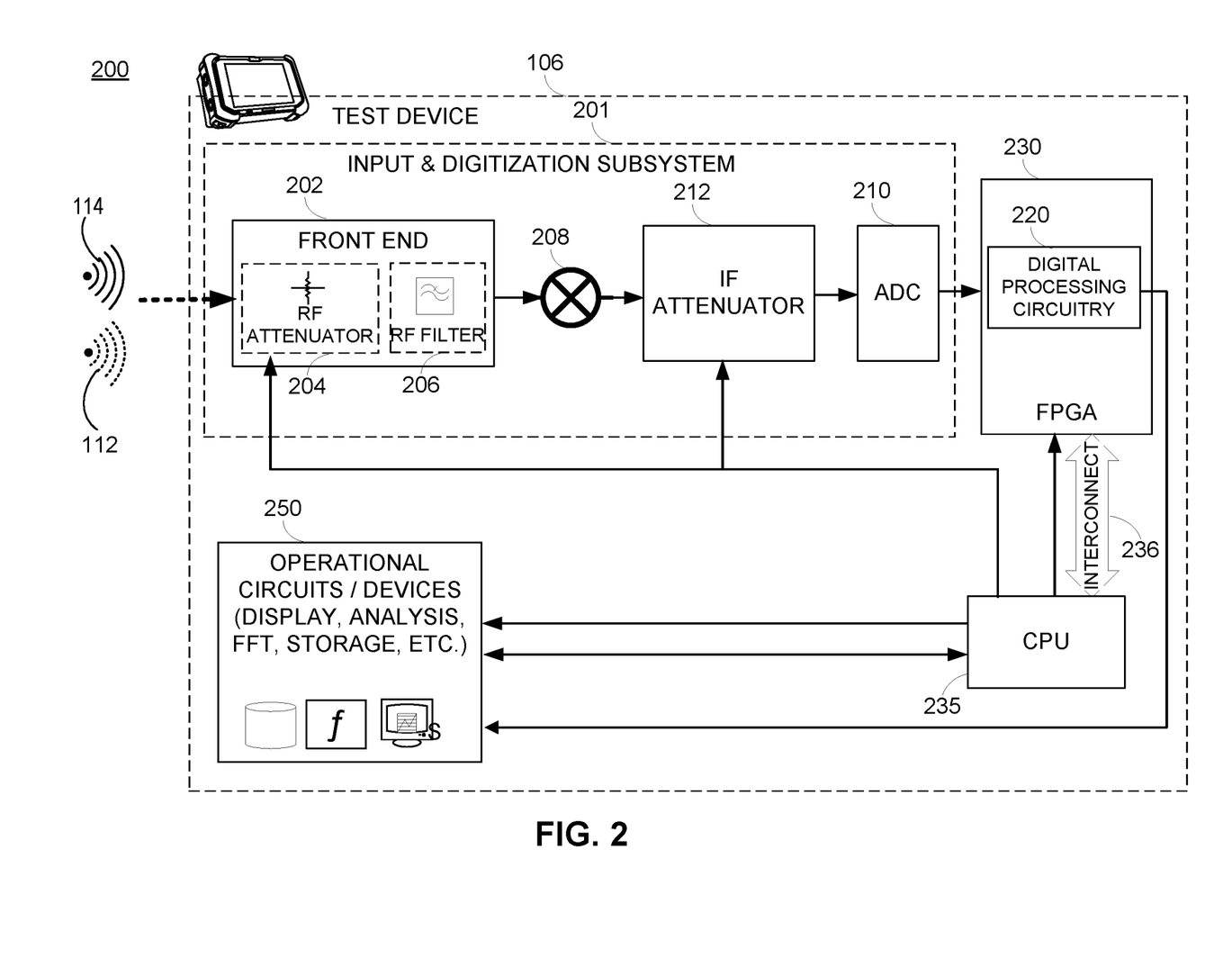
FIG. 2 illustrates a block diagram of major components of the test device including an RF attenuator and an intermediate frequency (IF) attenuator, according to an example.

FIG. 2 illustrates a block diagram 200 of major components of the test device 106 including an RF attenuator and an intermediate frequency (IF) attenuator, according to an example. As block diagram 200 shows, the signals 114 (from the cellular network tower 108) and signals 112 may be received by a receiver of the test device 106 and pre-processed by a front end 202 of an input and digitization subsystem 201. For example, the user 104 (technician) may be using the test device 106 to perform spectrum and signal analysis of the received signals such as discussed above.

The front end 202 may include, among other circuits and subsystems, an RF attenuator 204 and an RF filter 206. The attenuated and filtered signal (pre-processed RF signal) may be down-converted at a mixer 208 of the input and digitization subsystem 201, and the down-converted signal provided to an ADC 210 through an IF attenuator 212 in the input and digitization subsystem 201. The ADC 210 may provide digitized signal(s) to a field programmable gate array (FPGA) 230, which may include digital processing circuitry 220 to process the digitized signal(s) before they are provided to operational circuits and devices 250 (also referred to as operational subsystems). A CPU 235 may manage one or more components of the test device 106 such as the ADC 210, the FPGA 230, the RF attenuator 204, the IF attenuator 212, and at least some of the operational circuits and devices 250.

In some examples, the digital output of the ADC 210 may be provided to the digital processing circuitry 220, which may be partially or wholly implemented in the FPGA 230. The digital processing circuitry 220 may include detectors, normalizers, filters, etc. Digitally processed signals may be provided by the FPGA 230 to operational circuits and devices 250, which may perform analytical operations such as displaying the signals, fast Fourier transforms (FFTs), storing the signals and/or analysis results, and similar operations. Thus, the operational circuits and devices 250 may include an analysis subsystem, a display subsystem, an FFT subsystem, a storage subsystem, and comparable subsystems and circuits.

In some examples, the CPU 235 may communicate with other components over various interfaces and control their operations. For example, the CPU 235 may control an ADC sample clock (not shown) and set clock frequencies to be provided to the ADC 210. The CPU 235 and the FPGA 230 may also communicate over a peripheral component interconnect (PCI) interface (interconnect 236). For example, processed (spectrum-analyzed) data may be transmitted by the FPGA 230 to the CPU 235 to be further processed and/or displayed.

In some examples, the mixer 208 may down-convert and provide an input signal to the ADC 210 through IF attenuator 212. In other examples, the mixer 208 may be a mixing subsystem and include two or more mixers, which may down-convert multiple RF signals to IF signals simultaneously. Digitized signals from the ADC may be provided to various input ports of the FPGA 230.

As mentioned herein, the test device 106 may include a signal and spectrum analyzer (for example, a portable test device to be used in the field) and may include additional circuitry and subsystems such as a voltage-controlled oscillator (VCO) for the mixer 208, additional filters, mixers, oscillators, a frequency synthesizer, and so on. Thus, the analog input signal(s) may be processed by any number of analog processing circuitry and the digital signals converted by the ADC 210 may be processed by any number of digital processing circuitry.

The ADC's performance, thereby an overall performance of the test device 106, may depend on, among other things, an input range utilization of the ADC. For example, if the ADC is in overrange, digitization errors may occur. If the input signal is too low, the SNR may not be able to be accurately determined. Other performance characteristics of the ADC may be affected too. In some examples, the input signal to the ADC may be attenuated (or attenuation removed) to prevent overrange (or to prevent too low input signal level). The attenuation control may be based on EVM.

EVM is a metric to quantify the combination of error impairments in a system (e.g., test device 106). EVM may be represented through a plot of in-phase (I) and quadrature (Q) vectors also known as a constellation diagram and computed by identifying an ideal constellation location for each received signal. A root means square (rms) of all error vector magnitudes between the received signal locations and their closest ideal constellation locations may be defined as the EVM value of the system (e.g., test device 106). Quantitatively, the EVM may be expressed as:

$$EVM_{frame} = \sqrt{\frac{\sum_{j=1}^{L_p} \sum_{i=1}^{N_c} (R_{i,j} - S_{i,j})^2}{N_c L_p P_0}} \quad (1)$$

where Lp is the number of frames, Nc is the number of carriers, Ri,j is the received signal, and Si,j is the ideal signal location.

As an error metric, EVM is closely related to all error sources within a system. The EVM may be quantified as an impact of all the impairments by determining how they distort the received and transmitted signals. Example impairments may include, but are not limited to, thermal noise, phase noise, and nonlinearities. In some examples, the factors that contribute to the EVM may be combined into a single plot by considering the EVM contribution of each impairment and the input signal level. For example, at low signal levels, the EVM performance may be dominated by the noise performance of the system (i.e., low SNR). At high signal levels, the nonlinearities in the system may dominate the EVM (i.e., overrange of the ADC). An optimum EVM level for a system may be defined by the combination of all the error sources. In some example implementations, an attenuation value for the input of the ADC 210 (RF and/or IF) may be determined based on the EVM level.

While SNR and overrange are discussed as example characteristics of an ADC in conjunction with EVM and input attenuation determination, characteristics of an ADC may vary across a broad range. Commonly used metrics for quantifying ADC characteristics include resolution, SINAD, ENOB, SNR, THD, THD+N, and/or SFDR. A resolution of the ADC is a number of bits the ADC uses to digitize the input samples. For an N bit ADC, the number of discrete digital levels that can be produced is 2N. For example, a 12-bit ADC may resolve 4096 levels. SINAD is the ratio of the rms signal amplitude to the mean value of the root-sum-square (rss) of all other spectral components, including harmonics, but excluding DC. ENOB may be derived from SINAD using the relationship for the theoretical SNR of an ideal N-bit ADC, which may be expressed as:

$$SNR = 6.02N + 1.76 \text{ dB} \quad (2)$$

Expression (2) may be solved for N, and the value of SINAD may be substituted for SNR, arriving at ENOB, which may be expressed as:

$$ENOB = (SINAD - 1.76 \text{ dB})/6.02 \quad (3)$$

THD is the ratio of the rms value of the fundamental signal to the mean value of the root-sum-square of its harmonics (generally, the first 5 harmonics are considered significant). THD+N is the ratio of the rms value of the fundamental signal to the mean value of the root-sum-square of its harmonics plus all noise components (excluding DC). SFDR is the ratio of the rms value of the signal to the rms value of the worst spurious signal regardless of where it falls in the frequency spectrum. The worst spurious signal may or may not be a harmonic of the original signal. SFDR may be an important specification in communications systems because it represents the smallest value of signal that can be distinguished from a large interfering signal.

Accordingly, the EVM may take into account any of the herein mentioned or other ADC characteristics and input attenuator values may be determined based on those characteristics. In some examples, an initial setting value of the RF attenuator 204 and/or the IF attenuator 212 may be arbitrarily determined by the manufacturer. For example, the manufacturer may select attenuation values suitable for the most-used frequency and bandwidth in the market. In other examples, a user may select to use particular RF attenuator and/or IF attenuator values and override a processor determined set of values.

It should be appreciated that FIG. 2 shows a simplified block diagram of major components of the test device 106. A test device such as a spectrum analyzer may be implemented with additional of fewer components, where certain functionality may be distributed among various components and sub-systems or performed by additional components or sub-systems. Furthermore, the test device 106 may be any RF test device including, but not limited to, a spectrum analyzer, a cellular system monitoring device, an RF power analyzer, etc.

Figure 3A:
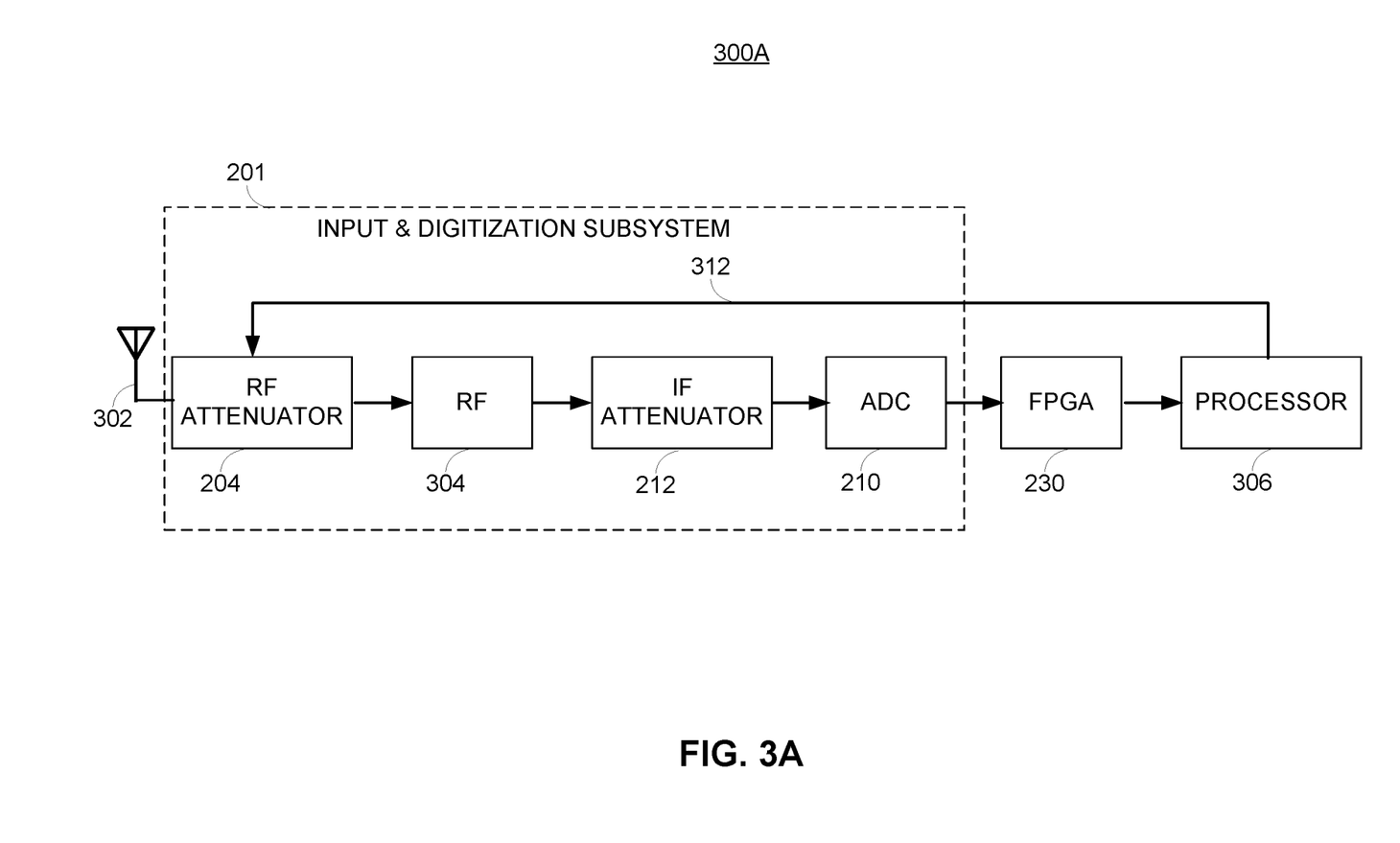
FIGS. 3A-3C illustrate various automatic attenuation configurations in the test device with an ADC, according to an example.
Figure 3B:
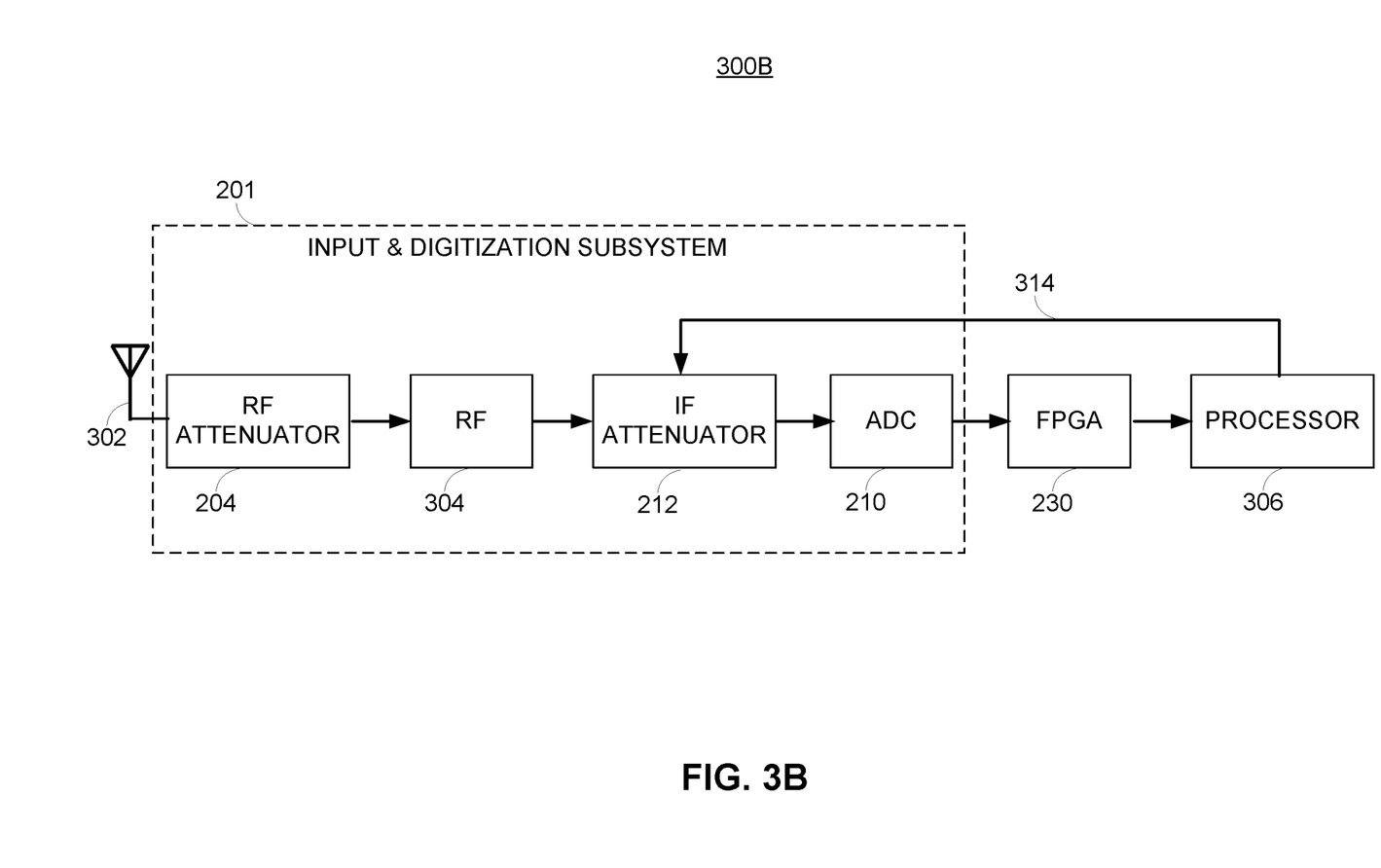
Figure 3C:
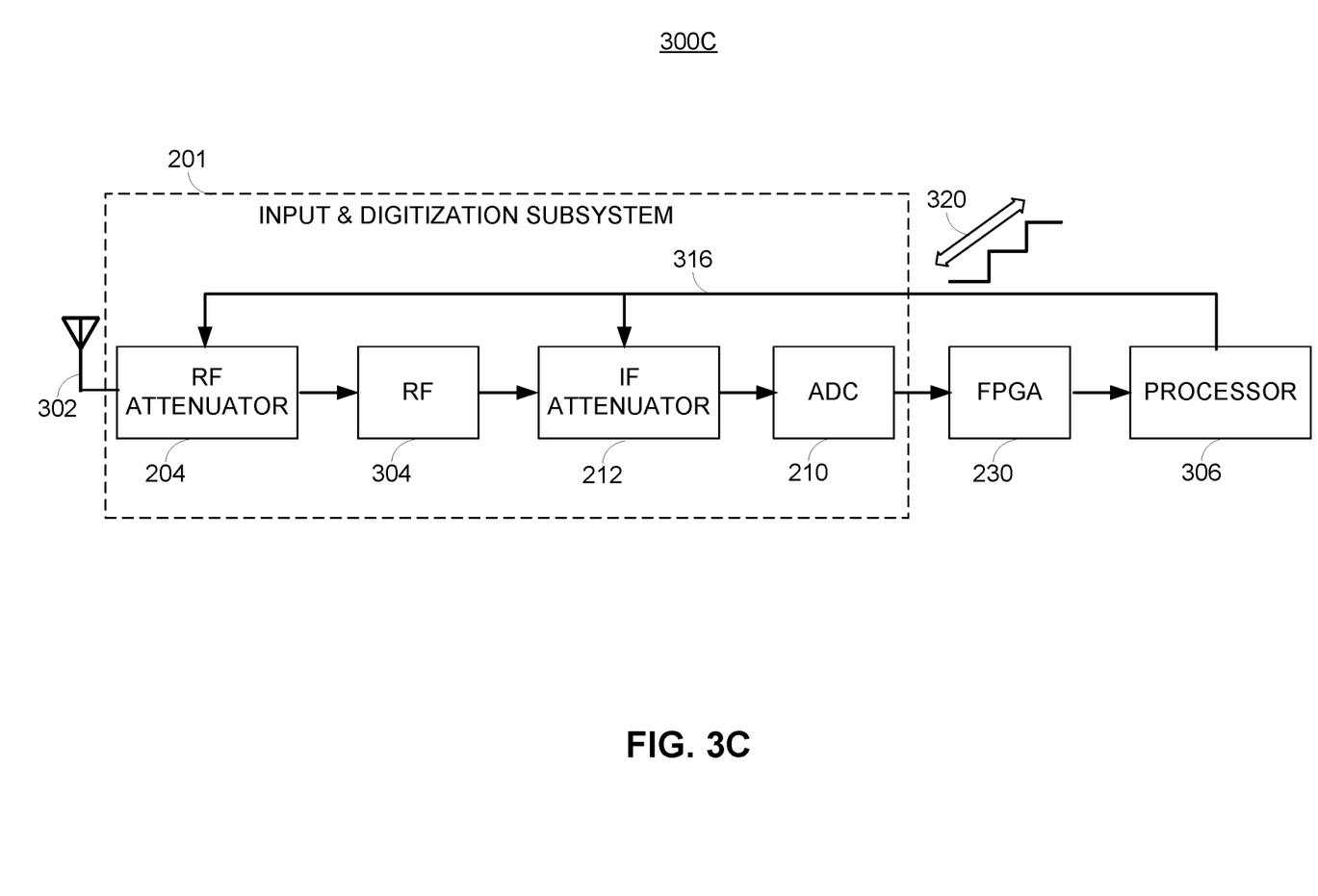

FIGS. 3A-3C illustrate various automatic attenuation configurations in the test device with an ADC, according to an example. A configuration 300A in FIG. 3A shows an input signal, for example, being received through an antenna 302. The received signal may be passed through an input and digitization subsystem 201, which may include being attenuated at RF attenuator 204, processed by RF circuitry 304 (e.g., RF filter 206, mixer 208), optionally further attenuated by the IF attenuator 212, and digitized by the ADC 210. The digitized signal from the input and digitization subsystem 201 may be processed by the FPGA 230 and provided to processor 306, which may be implemented as CPU 235 in FIG. 2. The processing of the digitized signal may include spectrum and signal analysis.

To optimize the ADC 210, the processor 306 may monitor an input of the ADC 210. The processor 306 may detect when an input signal of the ADC 210 is too low (unacceptable SNR) or too high (overrange). To prevent erroneous operation of the ADC 210 and optimization of ADC characteristics, the processor 306 may determine the EVM based on ADC performance and set (312) an attenuation value for the RF attenuator 204.

A configuration 300B in FIG. 3B shows the input signal also being received through the antenna 302, then optionally attenuated at the RF attenuator 204, processed by the RF circuitry 304 (e.g., RF filter 206, mixer 208), attenuated at the IF attenuator 212, digitized by the ADC 210 of the input and digitization subsystem 201. The digitized signal from the input and digitization subsystem 201 may be processed by the FPGA 230, and provided to the processor 306, which may be implemented as the CPU 235 in FIG. 2.

As mentioned herein, the processor 306 may monitor an input of the ADC 210. Thus, the processor 306 may detect when an input signal of the ADC 210 is too low (unacceptable SNR) or too high (overrange). To prevent erroneous operation of the ADC 210 and optimization of ADC characteristics, the processor 306 may determine the EVM based on ADC performance and set (314) an attenuation value for the IF attenuator 212.

A configuration 300C in FIG. 3C shows the input signal also being received through the antenna 302, then attenuated at the RF attenuator 204, processed by the RF circuitry 304 (e.g., RF filter 206, mixer 208), further attenuated by the IF attenuator 212, and digitized by the ADC 210 of the input and digitization subsystem 201 may. The digitized signal from the input and digitization subsystem 201 may be processed by the FPGA 230, and provided to the processor 306, which may be implemented as the CPU 235 in FIG. 2.

In some examples, the processor 306 may set (316) an attenuation value for the RF attenuator 204 and/or the IF attenuator. Thus, the signal may be attenuated at one or both of the attenuators based the EVM of the ADC 210. As mentioned herein, the EVM combines various performance characteristics of a device (e.g., the ADC 210). One such characteristic is SNR. An input signal may include a noise component, but there is also noise generated by various subsystems in a test device. Thus, when the input signal level is low, the noise generated inside the test device may begin to dominate and lower the SNR. On the other hand, if the input signal (e.g., the RF input) is too high, the ADC may go into overrange and begin showing digitization errors. In a spectrum analyzer, increasing a value of the RF attenuator 204 may reduce the level of the signal at the input mixer. Because the spectrum analyzer's noise is generated after the RF attenuator 204, the attenuator setting may have a substantial effect on the SNR. The IF attenuator's effect on SNR may be less compared to the RF attenuator. However, high settings of the IF attenuator 212 may affect a bandwidth of the input signal. As communication signals such as 5G or 6G tend to have relatively broad bandwidths, using the IF attenuator for sole control of ADC overrange may not be an optimal solution.

Accordingly, the processor 306 may determine an EVM of the ADC or alternatively the test device (e.g., spectrum analyzer) and set values of the RF attenuator 204 and the IF attenuator 212 based on the EVM. In some examples, the processor may step up and down (320) the attenuation values of the RF attenuator and the IF attenuator to find a suitable combination for a particular RF input signal (e.g., 5G or 6G with specific bandwidths). The settings may range from one attenuator not having any attenuation and the other having maximum attenuation to both attenuators being set to determined values. Processor 306 may employ a look-up table for various input signal types.

Figure 4:
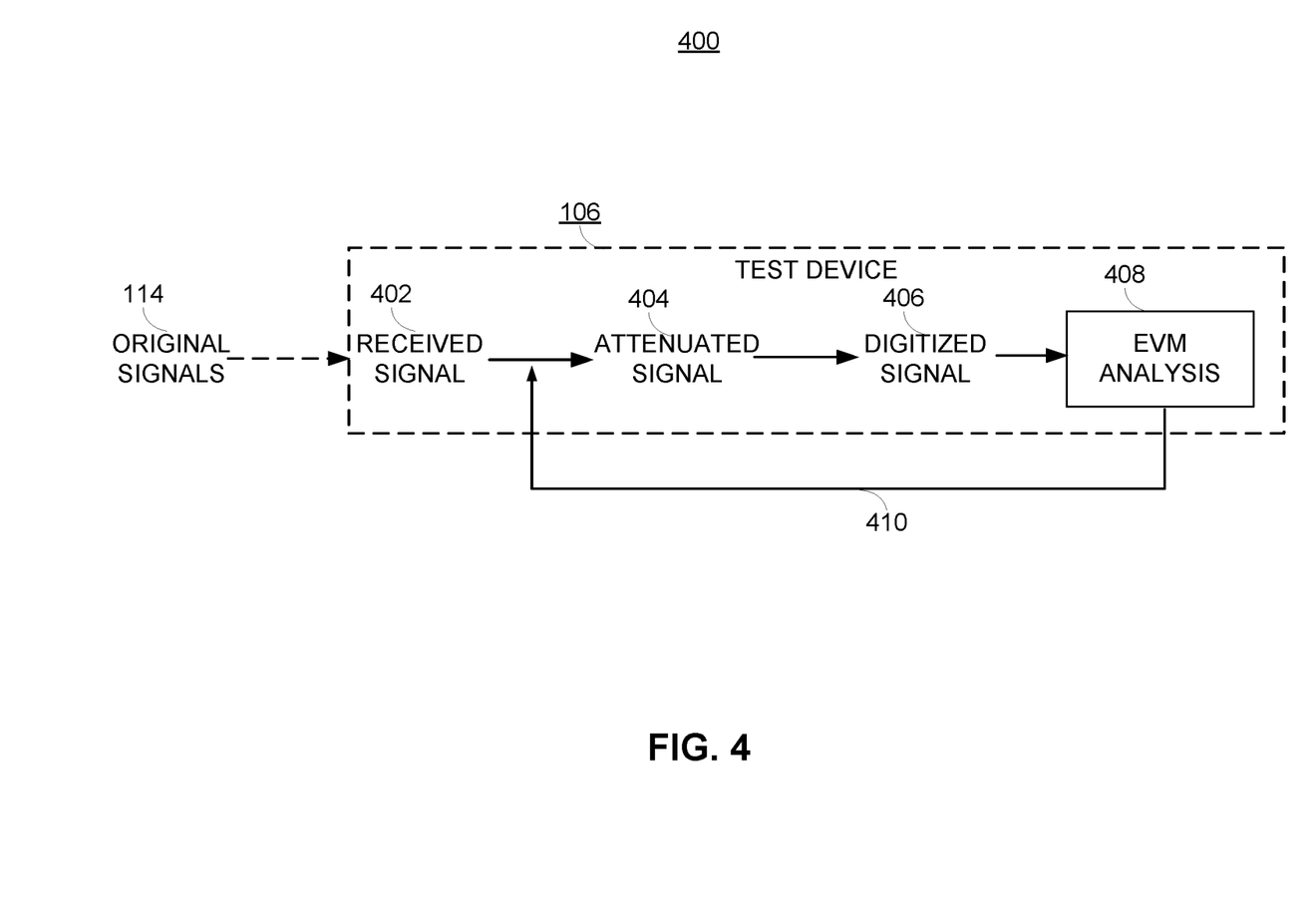
FIG. 4 illustrates a diagram of various signals in the test device, according to an example.

FIG. 4 illustrates a diagram 400 of various signals in the test device, according to an example. The diagram 400 shows original signals 114, which may be a communication signal (e.g., 5G or 6G) captured over the air or provided by a source device, being input to the test device 106 (e.g., a spectrum analyzer) as a received signal 402. The received signal 402 may be attenuated by an RF attenuator prior to a mixer for down-converting the received signal and/or by an IF attenuator post-mixer. The attenuated signal 404 may be converted to a digitized signal 406 by an ADC. The digitized signal 406 may be utilized by a variety of circuits and subsystems of the test device 106 to perform various functions such as display, transform, analysis, storage, etc.

In some examples, one of the functions performed on the digitized signal 406 may include EVM analysis 408, a result of which may be used to set (410) values of the RF attenuator and/or the IF attenuator as discussed herein. An example EVM analysis system 500 is discussed below in conjunction with FIG. 5. A processor monitoring the received signal 402 and/or the attenuated signal 404 (input to the ADC) may use the EVM results to select a combination of attenuation values for the RF attenuator and/or the IF attenuator. In some examples, the processor may employ a look-up table to select the attenuation values.

Table 1 below is an example look-up table, where different RF attenuator and IF attenuator values (represented by numeric value 1-4, where each number represents a specific attenuation value) are listed based on an input signal type, frequency range, and carrier bandwidth. Synchronization Signal Block (SSB) and Subcarrier Spacing (SCS) values are also listed (and may be used) in the example table.

TABLE 1

Example attenuation look-up table

| 5G/ 6G | Frequency range | Maximum carrier bandwidth | SSB SCS | RF attenuator | IF attenuator |
|---|---|---|---|---|---|
| 5G | 3.6-3.7 GHz | 100 MHz | 30 kHz | 1 | 1 |
| 5G | 28.1-28.9 GHz | 100 MHz | 60 kHz | 2 | 2 |

TABLE 1-continued

Example attenuation look-up table

| 5G/ 6G | Frequency range | Maximum carrier bandwidth | SSB SCS | RF attenuator | IF attenuator |
|---|---|---|---|---|---|
| 5G | 28.1-28.9 GHz | 400 MHz | 120 kHz | 3 | 3 |
| 6G | 100 GHz | 1 GHz | | 4 | 4 |

Contents of the look-up table may be determined for difference signal types, ADC types, and/or test device types through a calibration process and pre-loaded to the test device. In some cases, the look-up table values may be updated in the field, for example, if test device configuration is changed, an ADC is replaced, etc. Table 1 is intended as an illustrative example. Example implementations may utilize additional or fewer parameters to select attenuation values.

In some examples, an RF attenuator value may be selected in the range of RF attenuation values to achieve maximum SNR for improved EVM. An IF attenuator value may be selected after verifying an overrange status of the ADC. The described attenuator value selection may be used as a coarse approach in some examples. The coarse approach may be followed by a fine approach, where the attenuators' values may be tuned by testing dynamic range, EVM, etc. The fine approach can optimize the EVM, where the EVM value may reach a floor defined by phase noise or other impairments. In the described scenarios, the EVM may be expressed in simplified form as:

$$EVM = \frac{1}{\sqrt{SNR * L}} \quad (4)$$

where L is the coding gain, which may account for any benefits due to signal coding.

Figure 5:
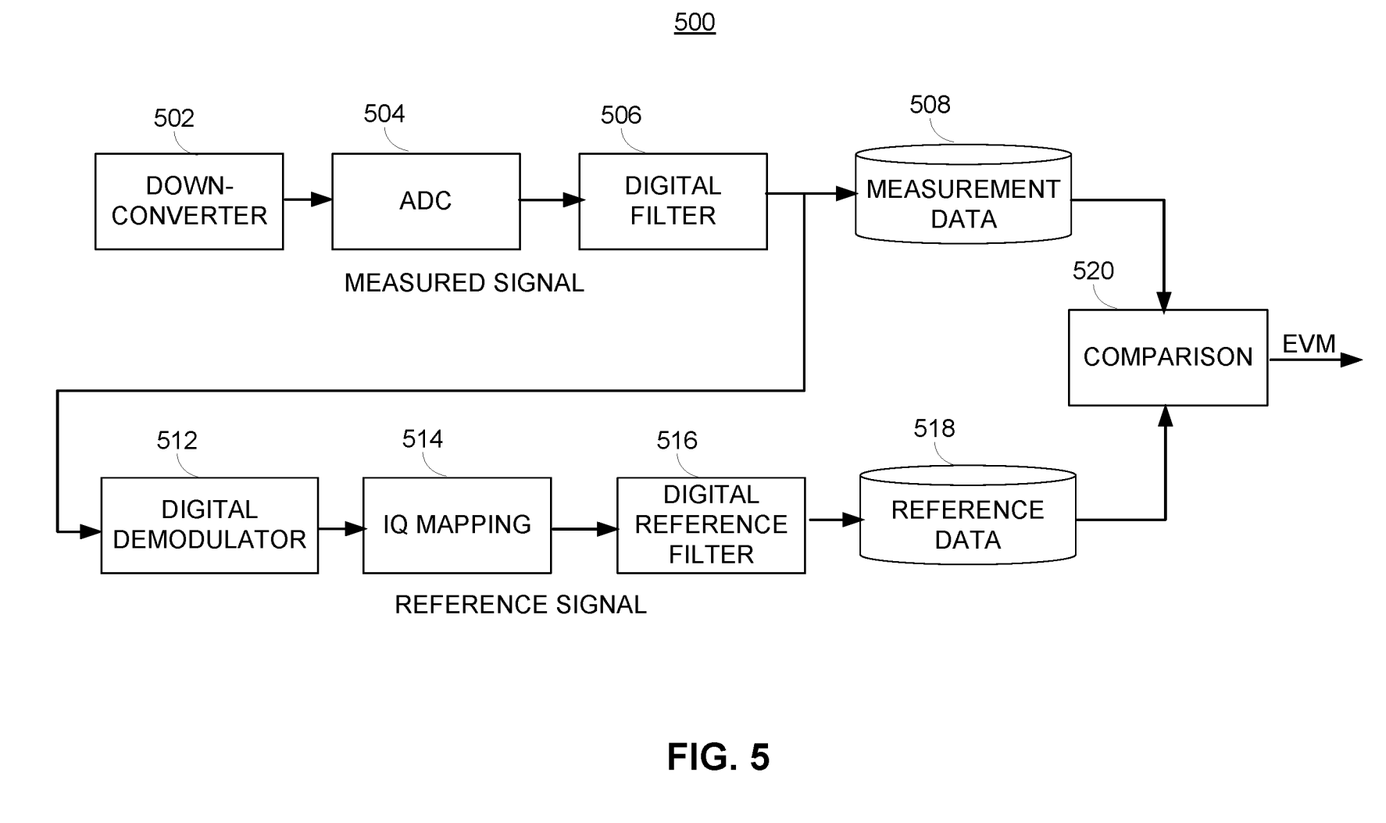
FIG. 5 illustrates a block diagram of an EVM analysis subsystem, according to an example.

FIG. 5 illustrates a block diagram of an EVM analysis subsystem 500, according to an example. An example EVM analysis subsystem 500 may include a down-converter 502 to down-convert the RF signal at a specified center frequency over a given bandwidth and an ADC 504 to digitize the down-converted input signal. The digitized signal may be passed through a digital filter 506, where a modulation scheme, a symbol rate, filter characteristics, etc. may be user selected. An output of the digital filter (measurement signal) may be saved as measurement data 508.

The measurement signal may also be demodulated digitally by digital demodulator 512 to recover the source digital data stream. IQ Mapping block 514 may map the digital data stream to in-phase (I) and quadrature (Q) vectors. A digital reference filter 516 may also be used. The EVM analysis subsystem 500 may generate a reference signal based on the recovered source data, modulation scheme, etc. The measurement data 508 and the reference data 518 may be compared at the comparison block 520 to compute error vectors by determining the difference of the measured and reference data vectors and normalizing to the peak signal level. From the set of error vectors, the rms and peak EVM scalar values may be extracted.

Figure 6:
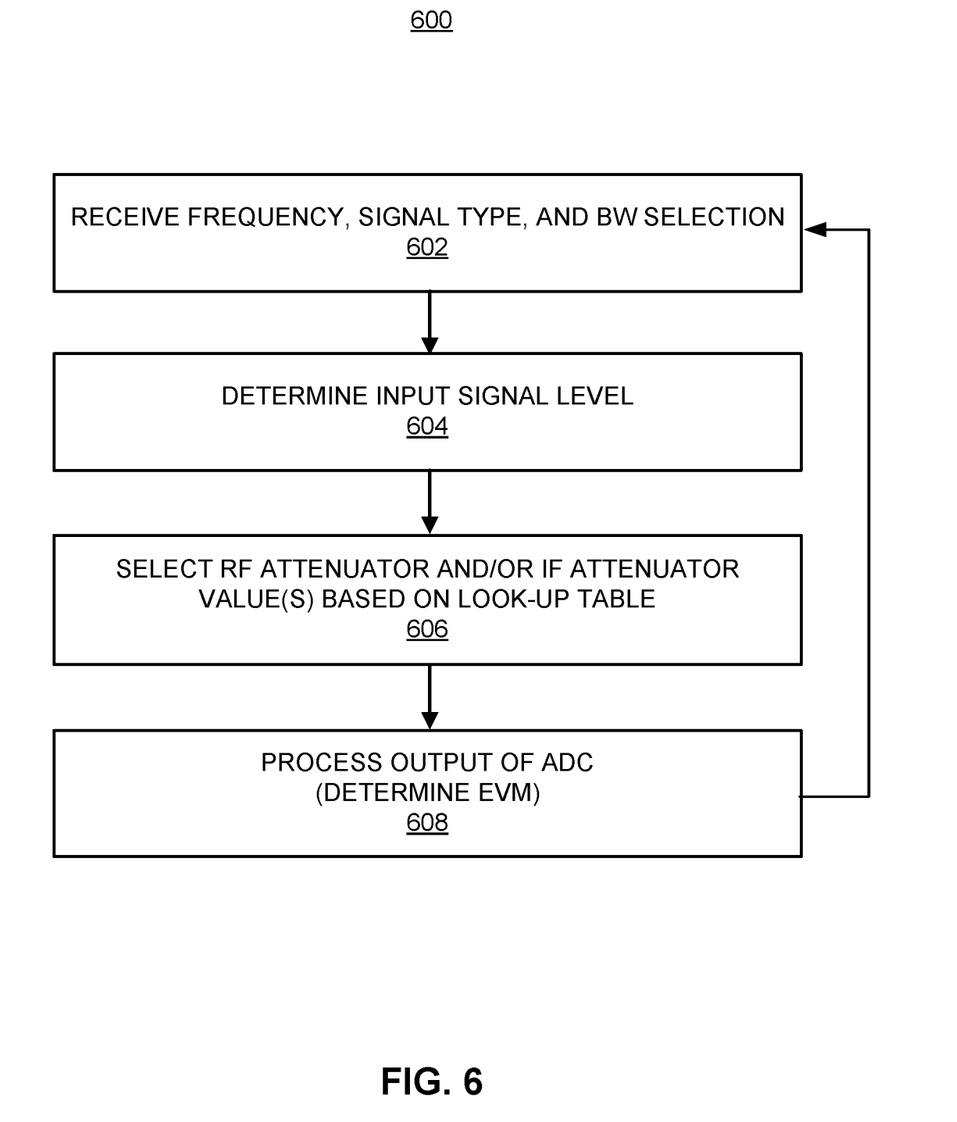
FIG. 6 illustrates a flow chart of a method for employing automatic attenuation of an ADC input to optimize EVM performance, according to an example.

FIG. 6 illustrates a flow chart of a method 600 for employing automatic attenuation of an ADC input to optimize EVM performance, according to an example. The method 600 is provided by way of example, as there may be a variety of ways to carry out the method described herein. Although the method 600 is primarily described as being performed by the circuits of FIGS. 2 and 3A-3C, the method 600 may be executed or otherwise performed by one or more processing components of another system or a combination of systems. Each block shown in FIG. 6 may further represent one or more processes, methods, or subroutines, and one or more of the blocks (e.g., the selection process) may include machine readable instructions stored on a non-transitory computer readable medium and executed by a processor or other type of processing circuit to perform one or more operations described herein.

At block 602, the test device 106 may receive an RF input signal with a particular frequency, bandwidth, and signal type (e.g., frequency division multiplexing, time division multiplexing, etc. based on a network technology). Along with the input signal, a user selection on the type, frequency, and bandwidth of the RF input signal may also be received. Alternatively, the signal characteristics may be determined automatically by the test device 106. The received RF input signal may be down-converted by a mixer and then digitized by an ADC for performing various operations by circuits and subsystems of the test device 106.

At block 604, a processor in the test device 106 may monitor the input signal level. The processor may determine the input RF signal level as well as the level of a signal at the input of an ADC (post down-conversion). As discussed herein, if the input level of the ADC is too low, SNR may be unacceptable. On the other hand, if the input level of the ADC is too high, the ADC may go into overrange mode and digitization errors may occur.

At block 606, attenuation values for an RF attenuator at the input of the test device 106 and/or an IF attenuator at the input of the ADC may be selected by the processor based on a look-table, for example. While the initial settings may be based on user selection or most common values based on expected signal type(s), the processor may make the selection based on an EVM analysis of the ADC (or the test device 106).

At block 608, the digitized signal(s) may be processed by an FPGA and other circuits and subsystems of the test device 106 for various operations such as display, analysis, transform, storage, etc. Additionally, and EVM analysis may be performed and used by the processor to set and/or adjust the attenuation values for the RF attenuator and/or the IF attenuator.

In some examples, the process may be an iterative one. Thus, the processor may continually (periodically or at random intervals) or on-demand monitor the input signal and the EVM adjusting the attenuation values. For example, each time the input RF signal type changes, the processor may update the attenuation values.

Figure 7:
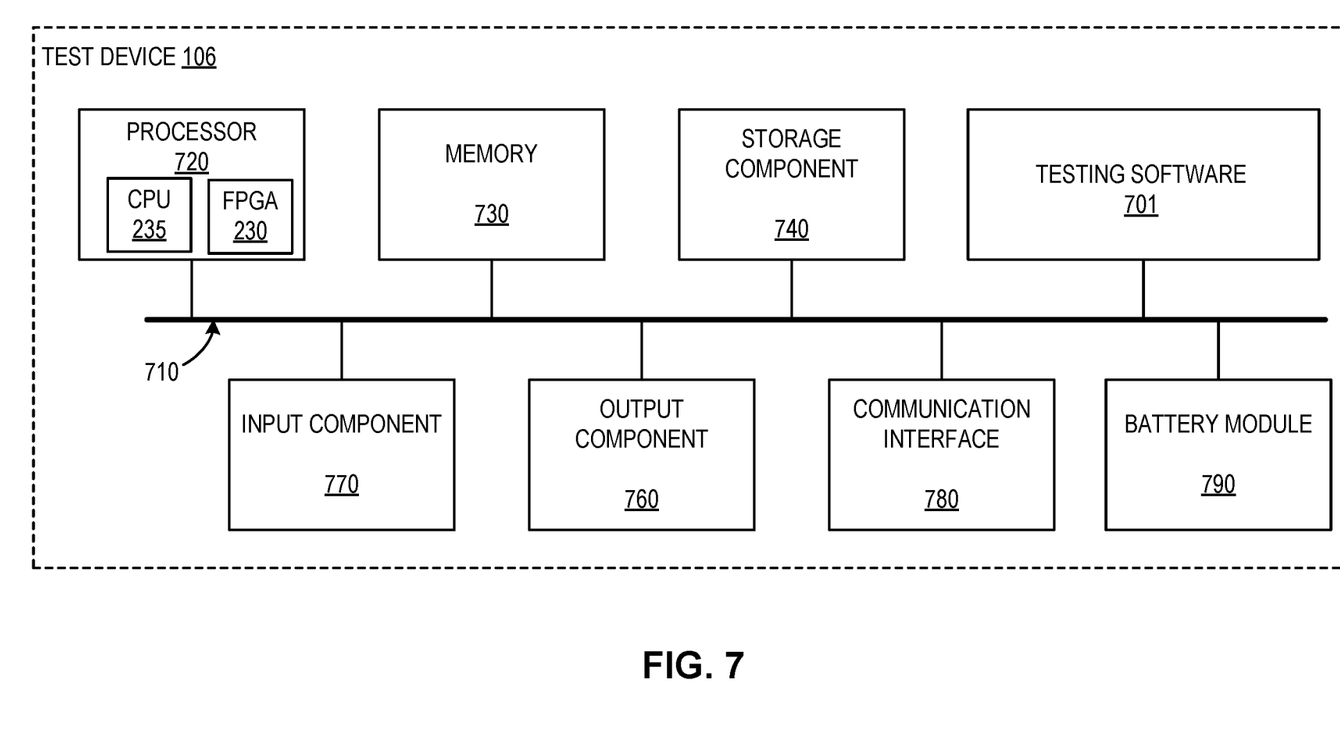
FIG. 7 illustrates a block diagram of the test device, according to an example.

FIG. 7 illustrates a block diagram of the test device 106, according to an example. As shown in FIG. 7, the test device 106 may include the components of FIG. 2 and the components shown in FIG. 7. The test device 106 may include a bus 710, a processor 720, a memory 730, a storage component 740, an input component 770, an output component 760, a communication interface 780, and battery module 790.

Bus 710 includes a component that permits communication among the components of test device 106. Processor 720 may be implemented in hardware, firmware, or a combination of hardware and software. Processor 720 may include one or more of a central processing unit (CPU) 235, a graphics processing unit (GPU), an accelerated processing unit (APU), a microprocessor, a microcontroller, a digital signal processor (DSP), a field-programmable gate array (FPGA) 230, an application-specific integrated circuit (ASIC), or another type of processing component. In some examples, processor 720 may include one or more processors capable of being programmed to perform a function. Memory 730 may include one or more memories such as a random access memory (RAM), a read only memory (ROM), and/or another type of dynamic or static storage device (e.g., a flash memory, a magnetic memory, and/or an optical memory) that store information and/or instructions for use by processor 720.

Storage component 740 stores information and/or software related to the operation and use of test device 106. For example, storage component 740 may include a hard disk (e.g., a magnetic disk, solid state disk, etc.) and/or another type of non-transitory computer-readable medium.

Input component 770 may include a component that permits the test device 106 to receive information, such as via user input (e.g., a touch screen display, a keyboard, a keypad, a mouse, a button, a switch, and/or a microphone). Additionally, or alternatively, input component 770 may include a sensor for sensing information (e.g., a GPS component, an accelerometer, a gyroscope, and/or an actuator). Output component 760 includes a component that provides output information from the test device 106 (e.g., a display, a speaker, a user interface, and/or one or more light-emitting diodes (LEDs)). Output component 760 may include a display providing a GUI. Input component 770 and output component 760 may be combined into a single component, such as a touch responsive display, also known as a touchscreen.

Communication interface 780 may include a transceiver-like component (e.g., a transceiver and/or a separate receiver and transmitter) that enables test device 106 to communicate with other devices, such as via a wired connection, a wireless connection, or a combination of wired and wireless connections. Communication interface 780 may permit the test device 106 to receive information from another device and/or provide information to another device. For example, communication interface 780 may include an Ethernet interface, an optical interface, a coaxial interface, an infrared interface, an RF interface, a universal serial bus (USB) interface, a Wi-Fi interface, a cellular network interface, or the like.

Battery module 790 is connected along bus 710 to supply power to processor 720, memory 730, and internal components of the test device 106. Battery module 790 may supply power during field measurements by the test device 106. Battery module 790 may permit the test device 106 to be a portable.

The test device 106 may perform one or more processes described herein. The test device 106 may perform these processes by processor 720 executing software instructions (e.g., testing software 701) stored by a non-transitory computer-readable medium, such as memory 730 and/or storage component 740. A computer-readable medium is defined herein as a non-transitory memory device. A memory device includes memory space within a single physical storage device or memory space spread across multiple physical storage devices.

Software instructions may be read into memory 730 and/or storage component 740 from another computer-readable medium or from another device via communication interface 780. When executed, software instructions stored in memory 730 and/or storage component 740 may instruct processor 720 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The test device 106 may include components other than shown. For example, the test device 106 may include a spectrum analyzer and power meter for performing tests described above. The number and arrangement of components shown in FIG. 7 are provided as an example. In practice, the test device 106 may include additional components, fewer components, different components, or differently arranged components than those shown in FIG. 7. Additionally, or alternatively, a set of components (e.g., one or more components) of the test device 106 may perform one or more functions described as being performed by another set of components of the test device 106.

While specific circuit configurations such as the arrangements of a number of components are shown in conjunction with the test device including an RF attenuator and an IF attenuator herein, the illustrated configurations are not intended to be limiting. A test device employing automatic attenuation of input signal for ADC performance may be implemented with other configurations and component values using the principles described herein.

While examples described herein are directed to configurations as shown, it should be appreciated that any of the components described or mentioned herein may be altered, changed, replaced, or modified, in size, shape, and numbers, or material, depending on application or use case, and adjusted for desired resolution or optimal measurement results.

It should be appreciated that the apparatuses, systems, and methods described herein may minimize and/or reduce analog-digital conversion errors and inaccuracies due to two or more signals with different characteristic being converted by the same ADC, and thereby facilitate more reliable and accurate RF measurements, specifically for input signals with different frequencies, bandwidths, and types. It should also be appreciated that the apparatuses, systems, and methods, as described herein, may also include, or communicate with other components not shown. For example, these may include external processors, counters, analyzers, computing devices, and other measuring devices or systems. This may also include middleware (not shown) as well. The middleware may include software hosted by one or more servers or devices. Furthermore, it should be appreciated that some of the middleware or servers may or may not be needed to achieve functionality. Other types of servers, middleware, systems, platforms, and applications not shown may also be provided at the backend to facilitate the features and functionalities of the testing and measurement system.

Moreover, single components may be provided as multiple components, and vice versa, to perform the functions and features described herein. It should be appreciated that the components of the system described herein may operate in partial or full capacity, or it may be removed entirely. It should also be appreciated that analytics and processing techniques described herein with respect to the optical measurements, for example, may also be performed partially or in full by other various components of the overall system.

It should be appreciated that data stores may also be provided to the apparatuses, systems, and methods described herein, and may include volatile and/or nonvolatile data storage that may store data and software or firmware including machine-readable instructions. The software or firmware may include subroutines or applications that perform the functions of the measurement system and/or run one or more application that utilize data from the measurement or other communicatively coupled system.

The various components, circuits, elements, components, and interfaces, may be any number of mechanical, electrical, hardware, network, or software components, circuits, elements, and interfaces that serves to facilitate communication, exchange, and analysis data between any number of or combination of equipment, protocol layers, or applications. For example, the components described herein may each include a network or communication interface to communicate with other servers, devices, components or network elements via a network or other communication protocol.

What has been described and illustrated herein are examples of the disclosure along with some variations. The terms, descriptions, and figures used herein are set forth by way of illustration only and are not meant as limitations. Many variations are possible within the scope of the disclosure, which is intended to be defined by the following claims—and their equivalents—in which all terms are meant in their broadest reasonable sense unless otherwise indicated.

The invention claimed is:

1. An input and digitization subsystem for a radio frequency (RF) test device, comprising:
    an RF attenuator to attenuate a received RF signal;
    a mixer to down-convert the attenuated RF signal from the RF attenuator;
    an intermediate frequency (IF) attenuator to attenuate the down-converted signal from the mixer;
    an analog-to-digital converter (ADC) to digitize the attenuated, down-converted signal from the IF attenuator; and
    a processor to select attenuation values for one or more of the RF attenuator and the IF attenuator based on one or more of an error magnitude vector (EVM) analysis, an RF signal type, or a signal level at an input of the ADC, and
    wherein the EVM analysis comprises analysis of one or more characteristics of the RF test device.

2. The input and digitization subsystem of claim 1, wherein initial attenuation values for one or more of the RF attenuator and the IF attenuator are selected based on one or more of an expected RF signal type, RF signal frequency, or RF signal bandwidth.

3. The input and digitization subsystem of claim 1, wherein the attenuation values for one or more of the RF attenuator and the IF attenuator are selected in an iterative manner stepping the attenuation values for the RF attenuator and the IF attenuator up or down.

4. The input and digitization subsystem of claim 1, wherein the EVM analysis comprises analysis of one or more of a resolution, a signal-to-noise-and-distortion ratio (SINAD), an effective number of bits (ENOB), a signal-to-noise ratio (SNR), a total harmonic distortion (THD), a total harmonic distortion plus noise (THD+N), or a spurious free dynamic range (SFDR) of the ADC.

5. The input and digitization subsystem of claim 1, further comprising:
    a field programmable gate array (FPGA), comprising digital processing circuitry, to process the digitized signal from the ADC and send the processed digitized signal to operational circuits for displaying or storing the processed digitized signal.

6. The input and digitization subsystem of claim 1, wherein the processor is to select the attenuation values for both the RF attenuator and the IF attenuator.

7. The input and digitization subsystem of claim 1, wherein the attenuation values for one or more of the RF attenuator and the IF attenuator are selected from a look-up table.

8. A test device to analyze radio frequency (RF) signals, comprising:
    an input and digitization subsystem comprising:
        an RF attenuator to attenuate a received RF signal;
        a mixer to down-convert the attenuated RF signal from the RF attenuator;
        an intermediate frequency (IF) attenuator to attenuate the down-converted signal from the mixer; and
        an analog-to-digital converter (ADC) to digitize the attenuated, down-converted signal from the IF attenuator;
    a field programmable gate array (FPGA) to receive and process the digitized signal from the ADC; and
    a processor to manage operation of one or more of the RF attenuator, the IF attenuator, the ADC, and the FPGA,
    wherein the processor is to select attenuation values for one or more of the RF attenuator and the IF attenuator based on one or more of an error magnitude vector (EVM) analysis, an RF signal type, or a signal level at an input of the ADC, and
    wherein the EVM analysis comprises analysis of one or more characteristics of the RF test device.

9. The test device of claim 8, further comprising at least one of an EVM analysis subsystem, a display subsystem, an analysis subsystem, a fast Fourier transform (FFT) subsystem, or a storage subsystem.

10. The test device of claim 8, wherein the processor is to select
    initial attenuation values for one or more of the RF attenuator and the IF attenuator based on one or more of an expected RF signal type, RF signal frequency, or RF signal bandwidth, and
    the attenuation values for one or more of the RF attenuator and the IF attenuator in an iterative manner stepping the attenuation values for the RF attenuator and the IF attenuator up or down.

11. The test device of claim 8, wherein the processor is to select the attenuation values for one or more of the RF attenuator and the IF attenuator from a look-up table.

12. The test device of claim 8, wherein the EVM analysis comprises analysis of one or more of a resolution, a signal-to-noise-and-distortion ratio (SINAD), an effective number of bits (ENOB), a signal-to-noise ratio (SNR), a total harmonic distortion (THD), a total harmonic distortion plus noise (THD+N), or a spurious free dynamic range (SFDR) of the ADC.

13. The test device of claim 8, wherein the FPGA comprises one or more digital processing circuitry to receive and process the digitized signal.

14. The test device of claim 8, further comprising:
    one or more operational subsystems to perform analytical operations on the digitized signal.

15. The test device of claim 8, wherein the test device is a spectrum analyzer.

16. A method, comprising:
    receiving a radio frequency (RF) signal at an input of an RE device;
    attenuating, by an RF attenuator of the RF test device, the received RF signal;

down-converting, by a mixer of the RF test device, the attenuated RF signal from the RF attenuator;

attenuating, by an intermediate frequency (IF) attenuator of the RF test device, the down-converted signal from the mixer;

digitizing, by an analog-to-digital converter (ADC) of the RF test device, the attenuated, down-converted signal from the IF attenuator; and selecting, by a processor of the RF test device, attenuation values for one or more of the RF attenuator and the IF attenuator based on one or more of an error magnitude vector (EVM) analysis, an RF signal type, or a signal level at an input of the ADC, wherein the EVM analysis comprises analysis of one or more characteristics of the RF test device.

17. The method of claim 16, further comprising:
selecting the attenuation values for one or more of the RF attenuator and the IF attenuator from a look-up table.

18. The method of claim 16, further comprising:
selecting initial attenuation values for one or more of the RF attenuator and the IF attenuator based on one or more of an expected RF signal type, RF signal frequency, or RF signal bandwidth.

19. The method of claim 16, further comprising:
selecting the attenuation values for one or more of the RF attenuator and the IF attenuator in an iterative manner by stepping the attenuation values for the RF attenuator and the IF attenuator up or down.

20. The method of claim 16, further comprising:
performing, by the processor, the EVM analysis based on one or more of a resolution, a signal-to-noise-and-distortion ratio (SINAD), an effective number of bits (ENOB), a signal-to-noise ratio (SNR), a total harmonic distortion (THD), a total harmonic distortion plus noise (THD+N), or a spurious free dynamic range (SFDR) of the ADC.

* * * * *